UNITED STATES PATENT OFFICE.

TREADWAY B. MUNROE, OF FOREST GLEN, MARYLAND, ASSIGNOR TO B. G. DAHLBERG, OF ST. PAUL, MINNESOTA.

FIREPROOFING COMPOSITION AND PROCESS OF MAKING THE SAME.

1,338,322.   Specification of Letters Patent.   Patented Apr. 27, 1920.

No Drawing.   Application filed August 28, 1919.   Serial No. 320,493.

*To all whom it may concern:*

Be it known that I, TREADWAY B. MUNROE, a citizen of the United States, residing at Forest Glen, in the county of Montgomery and State of Maryland, have invented certain new and useful Improvements in Fireproofing Composition and Processes of Making the Same; and I do hereby declare the following to be a full, clear, and exact description of the invention, such as will enable others skilled in the art to which it appertains to make and use the same.

This invention relates to a fire proofing composition for fiber boards and the process of making the same, and has for its object to improve the boards and processes heretofore proposed.

With this and other objects in view the invention consists in the novel product and novel combinations of steps for producing said product, all as will be more fully hereinafter disclosed and particularly pointed out in the claims.

In order that the invention may be more clearly understood it is said: It is well known that if zinc chlorid is added to ammonium hydroxid, an insoluble precipitate of zinc hydroxid is had, which is insoluble in water, but is soluble in an excess of ammonium hydroxid, forming a complex compound of ammonia with zinc oxid, probably having the formula $3ZnO.4NH_3.12H_2O$. This complex compound is further mixed with ammonium chlorid. This solution is found to be a useful fire proofing agent, for articles which are dipped therein, have precipitated on their fibers both the zinc hydroxid and the ammonium chlorid of the solution. When subjected to fire, these fire proofed articles have their zinc hydroxid constituents changed to zinc oxid, while the ammonium chlorid volatilizes, and being a nonsupporter of combustion, serves to aid in checking the fire, all as is well known.

In applying this solution to the fiber board, known as insulite, however, I find it cannot be satisfactorily used, because the excess of ammonium hydroxid present burns the board, owing to its pronounced causticity. Accordingly, in carrying out this invention, I prepare a fire-proofing solution in the manner above described, and then nearly neutralize the excess of ammonium hydroxid with hydrochloric acid, with hydro-fluo-silicic acid, or other suitable neutralizing compound, thus leaving the zinc hydroxid in the solution. If hydrochloric acid is employed as the neutralizing agent, I provide a much larger percentage of ammonium chlorid to be precipitated on the fibers, while if hydro-fluo-silicic acid is employed, I provide in the fire proofing solution a large percentage of ammonium fluo silicate, so that in either case, the solution is made richer in fire resisting constituents, while the objectionable caustic action of the ammonium hydroxid on the fibers is avoided.

The fire proofing solution thus prepared may now be diluted with water to the desired strength, for the purpose in hand. If desired magnesium chlorid $MgCl_2$ may be used in place of zinc chlorid.

I prefer to employ this fire proofing solution in the tanks holding the pulp or fibers from which the board is made, so that each fiber is coated with said solution before it is compressed into the body of the board. I further prefer to subject the coated fibers to a felting action in said tanks before they reach the compressing rolls, as disclosed in my co-pending application, Serial Number 287,138, filed April 3, 1919, and entitled Thermo insulation material and process of producing the same.

I find that after said rolls have compressed out the excess of water, and solution, that the compressed fibers contain a very large percentage of said solution, which readily dries on the individual fibers, and in the interstices of the finished board.

In making this fireproofing solution and considering the equation

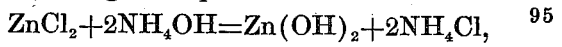
$$ZnCl_2 + 2NH_4OH = Zn(OH)_2 + 2NH_4Cl,$$

as well as the atomic and combining weights, it is found that 135 parts of zinc chlorid added to 70 parts of ammonium hydroxid yields 99 parts of zinc hydroxid and 106 parts of ammonium chlorid. From these considerations it can be shown that it requires 2.52 grams of pure $NH_4OH$ to react with 5 grams of pure $ZnCl_2$; or it will require 37.8 grams of 100% $NH_4OH$ to use up 75 grams 100% $ZnCl_2$. But in actual practice an excess of $NH_4OH$ is desired.

Therefore, in carrying out this invention I prefer to use, say 75 parts by weight of $ZnCl_2$ and 60 parts by weight of $NH_4OH$.

These proportions give one a clear solution, which I nearly neutralize with HCl, and call the resulting solution 100 per cent. strong. The above reagents are supposed to be chemically pure. In practice, commercial compounds are employed and due allowance must be made for their impurities.

In actually producing this fireproofing solution, I prefer to add the zinc chlorid dissolved in the least quantity of water, to the ammonium hydroxid solution, with constant stirring. I then nearly neutralize the resulting solution with the acid I desire to use, using as a test of the solution, ordinary litmus paper. The solution I thus obtain is clear, practically colorless, will stand dilution to at least 5 times its volume with water without precipitation, and has a slightly alkaline reaction. This alkaline reaction is so slight that it does not burn the fiber of the insulite when exposed to a temperature necessary to dry the moisture out of the insulite.

For fire proofing insulite, I take 1 part of my 100 per cent. solution and add thereto 3 parts of water to get a suitable strength for practical purposes. The excess solution that is squeezed out of the pulp by the compression rolls in making the board, is returned to the tank, so that the loss is quite small, while the insulite fibers will be found to have retained a very large percentage of the $ZnCl_2$ present.

When articles, such as insulite, are impregnated with the solution above described, and then subjected to the action of fire, very complex reactions ensue. Among them may be mentioned the fact that zinc oxid is formed, as well as fused zinc chlorid, which volatilizes and mixes with the fumes of ammonium chlorid that are freely evolved. The result of impregnating insulite with this solution is, therefore, an excellent protection against fire, under all ordinary exposures, without impairing the strength or waterproofing of the fibers.

It will be observed that both zinc and magnesium compounds are suitable for this invention, and they have the common property for the purpose in hand, that their chlorids are readily hydrolized in an aqueous solution, so that they give an acid reaction and form basic salts when evaporated to dryness.

It is obvious that those skilled in the art may vary the steps of this process as well as the article to which it is applied, without departing from the spirit of the invention, and therefore, I do not wish to be limited to the above disclosure, except as may be required by the claims.

What I claim is:—

1. The herein described new fire-proofing composition formed by mixing zinc chlorid with ammonium hydroxid in a quantity sufficient to form a solution containing free ammonium hydroxid; and nearly neutralizing said free ammonium hydroxid with a reagent yielding a fire-proofing compound, substantially as described.

2. The process of making a fire-proofing composition which consists in adding an excess of ammonium hydroxid to zinc chlorid to form a solution containing a complex compound of zinc oxid and ammonia as well as ammonium chlorid and free ammonium hydroxid; and nearly neutralizing said free ammonium hydroxid by adding a reagent capable of forming therewith a fire resisting compound, substantially as described.

3. The herein described new article of manufacture consisting of a body of fibrous material impregnated with a complex compound of zinc oxid and ammonia associated with another fire resisting compound formed from the reaction between ammonium hydroxid and a neutralizing agent, substantially as described.

4. The herein described new fireproofing composition formed by mixing zinc chlorid with ammonium hydroxid substantially in the proportions by weight of seventy-five parts of zinc chlorid to sixty parts of ammonium hydroxid; and nearly neutralizing the free ammonium hydroxid present with hydrochloric acid, substantially as described.

5. The herein described new fireproofing composition formed by mixing a chlorid of a metal capable of being readily hydrolyzed in an aqueous solution with ammonium hydroxid in a quantity sufficient to form a solution containing free ammonium hydroxid; and nearly neutralizing said free ammonium hydroxid with a reagent yielding a fire-proofing compound, substantially as described.

In testimony whereof I affix my signature, in presence of two witnesses.

TREADWAY B. MUNROE.

Witnesses:
F. A. DALE,
J. H. SHAW.